United States Patent
Fitzgerald et al.

(10) Patent No.: US 9,699,550 B2
(45) Date of Patent: Jul. 4, 2017

(54) REDUCED MICROPHONE POWER-UP LATENCY

(71) Applicant: QUALCOMM Incorporated, San Diego, CA (US)

(72) Inventors: Joseph Robert Fitzgerald, San Diego, CA (US); Bengt Stefan Gustavsson, San Diego, CA (US); Louis Dominic Oliveira, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 14/539,678

(22) Filed: Nov. 12, 2014

(65) Prior Publication Data

US 2016/0134966 A1    May 12, 2016

(51) Int. Cl.
*H04R 29/00* (2006.01)
*H04R 3/00* (2006.01)
*G06F 1/32* (2006.01)

(52) U.S. Cl.
CPC ............ *H04R 3/00* (2013.01); *H04R 3/005* (2013.01); *G06F 1/3215* (2013.01); *H04R 29/00* (2013.01); *H04R 29/004* (2013.01); *H04R 2499/11* (2013.01)

(58) Field of Classification Search
CPC .......... H04R 3/00; H04R 3/005; H04R 1/406; H04R 29/00; H04R 29/004
USPC ....................... 381/91–92, 110, 58
See application file for complete search history.

(56) References Cited

U.S. PATENT DOCUMENTS

| 6,070,140 | A  | * | 5/2000  | Tran .................. G06F 1/3203 |
|           |    |   |         | 704/232 |
| 6,397,186 | B1 |   | 5/2002  | Bush et al. |
| 6,505,057 | B1 |   | 1/2003  | Finn et al. |
| 8,798,289 | B1 |   | 8/2014  | Every et al. |
| 9,113,263 | B2 | * | 8/2015  | Furst .................. H04R 3/00 |
| 2005/0136848 | A1 |  | 6/2005 | Murray |
| 2011/0250881 | A1 | * | 10/2011 | Michel ............... H04W 52/244 |
|           |    |   |         | 455/423 |
| 2012/0014534 | A1 | * | 1/2012 | Bodley .................. H04N 7/15 |
|           |    |   |         | 381/77 |
| 2012/0250881 | A1 | * | 10/2012 | Mulligan .............. H03F 1/0261 |
|           |    |   |         | 381/92 |
| 2014/0133666 | A1 |   | 5/2014 | Tanaka et al. |
| 2014/0222436 | A1 |   | 8/2014 | Binder et al. |
| 2014/0254823 | A1 |   | 9/2014 | Yan et al. |
| 2014/0257813 | A1 |   | 9/2014 | Mortensen |
| 2014/0270246 | A1 | * | 9/2014 | Swanson ............... H04R 3/005 |
|           |    |   |         | 381/92 |
| 2014/0270247 | A1 | * | 9/2014 | Swanson ............... H04R 3/005 |
|           |    |   |         | 381/92 |
| 2014/0278435 | A1 |   | 9/2014 | Ganong, III et al. |

(Continued)

OTHER PUBLICATIONS

International Search Report and Written Opinion—PCT/US2015/055685—ISA/EPO—Dec. 18, 2015.

(Continued)

*Primary Examiner* — Disler Paul
(74) *Attorney, Agent, or Firm* — Toler Law Group, PC

(57) ABSTRACT

A method includes generating a command at a first microphone and sending the command from the first microphone to a second microphone. The command is sent to the second microphone via a bus that is coupled to the first microphone and to the second microphone.

30 Claims, 6 Drawing Sheets

(56) References Cited

U.S. PATENT DOCUMENTS

2014/0321664 A1* 10/2014 Huang ................. H04R 29/005
                                                            381/92
2016/0066113 A1*  3/2016 Elkhatib ............. H04R 29/004
                                                            381/56

OTHER PUBLICATIONS

Izumi S., et al., "Data Aggregation Protocol for Multiple Sound Sources Acquisition with Microphone Array Network," Computer Communications and Networks (ICCCN), 2011 Proceedings of 20th International Conference On, IEEE, Jul. 31, 2011 (Jul. 31, 2011), pp. 1-6, XP032049175, DOI: 10.11 09/ICCCN.2011.6005923 ISBN: 978-1 -4577-0637-0.

* cited by examiner

REDUCED MICROPHONE POWER-UP LATENCY

I. FIELD

The present disclosure is generally related to microphone power-up latency.

II. DESCRIPTION OF RELATED ART

Advances in technology have resulted in smaller and more powerful computing devices. For example, a variety of portable personal computing devices, including wireless telephones such as mobile and smart phones, tablets, and laptop computers, are small, lightweight, and easily carried by users. These devices can communicate voice and data packets over wireless networks. Further, many such devices incorporate additional functionalities such as a digital still camera, a digital video camera, a digital recorder, and an audio file player. Also, such devices can process executable instructions, including software applications, such as a web browser application, that can be used to access the Internet. As such, these devices can include significant computing capabilities.

Wireless devices may include a plurality of microphones to detect acoustic input sounds (e.g., speech, noise, and/or environmental noise). To reduce power consumption, a single microphone may be in an active mode and the other microphones may be in a sleep mode. A central processor (e.g., an application processor) within the wireless device may receive an indication of acoustic input sound from the active microphone. Upon receiving the indication of the acoustic input sound, the central processor may generate and send commands to another device (e.g., a coder/decoder (CODEC)) to enable the other microphones. Detecting the indication of the acoustic input sound at the central processor within the wireless device and sending commands to the other device to activate the other microphones may consume a relatively large amount of system power. Additionally, the power-up latency for the central processor to activate the other microphones may be relatively large.

III. SUMMARY

Systems and methods of reducing microphone power-up latency are disclosed. Multiple microphones (e.g., a first microphone, a second microphone, a third microphone, etc.) may be coupled to a CODEC or to an audio front-end, and the CODEC may be coupled to an application processor. During a low power state, the first microphone may be in an active mode and the other microphones may be in a sleep mode. While active, the first microphone may detect acoustic input sounds (e.g., speech, noise, and/or environmental noise). To illustrate, the first microphone may include logic circuitry (e.g., a microphone activity detection (MAD) unit or a processor) that monitors activity (e.g., acoustic input sound, noise level, keywords, etc.) at an input of the first microphone. Based on the activity, the logic circuitry may send a command (e.g., a "wake up" command) to the other microphones. For example, each microphone may be connected to a common bus, and the logic circuitry may send the command to the other microphones via the common bus. Upon receiving the command, logic circuitry (e.g., processors) within the other microphones may activate the other microphones.

In a particular aspect, a method includes generating a command at a first microphone and sending the command from the first microphone to a second microphone. The command is sent to the second microphone via a bus that is coupled to the first microphone and to the second microphone.

In another particular aspect, a microphone includes a processor and a memory storing instructions executable by the processor to perform operations. The operations include generating a command and sending the command from the microphone to a second microphone. The command is sent to the second microphone via a bus that is coupled to the microphone and to the second microphone.

In another particular aspect, a non-transitory computer-readable medium includes instructions that, when executed by a processor within a microphone, cause the processor to generate a command. The instructions are also executable to cause the processor to send the command from the microphone to a second microphone via a bus that is coupled to the microphone and to the second microphone.

In another particular aspect, a microphone includes means for generating a command and means for sending the command from the microphone to a second microphone. The command is sent to the second microphone via a bus that is coupled to the microphone and to the second microphone.

Particular advantages provided by at least one of the disclosed aspects include an ability to reduce microphone power-up latency compared to an architecture in which a software driver in an application processor sends a command to a CODEC to activate microphones. For example, signaling between an active microphone and the application processor is reduced, and signaling between the application processor and microphones in a "sleep state" is reduced. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 3:
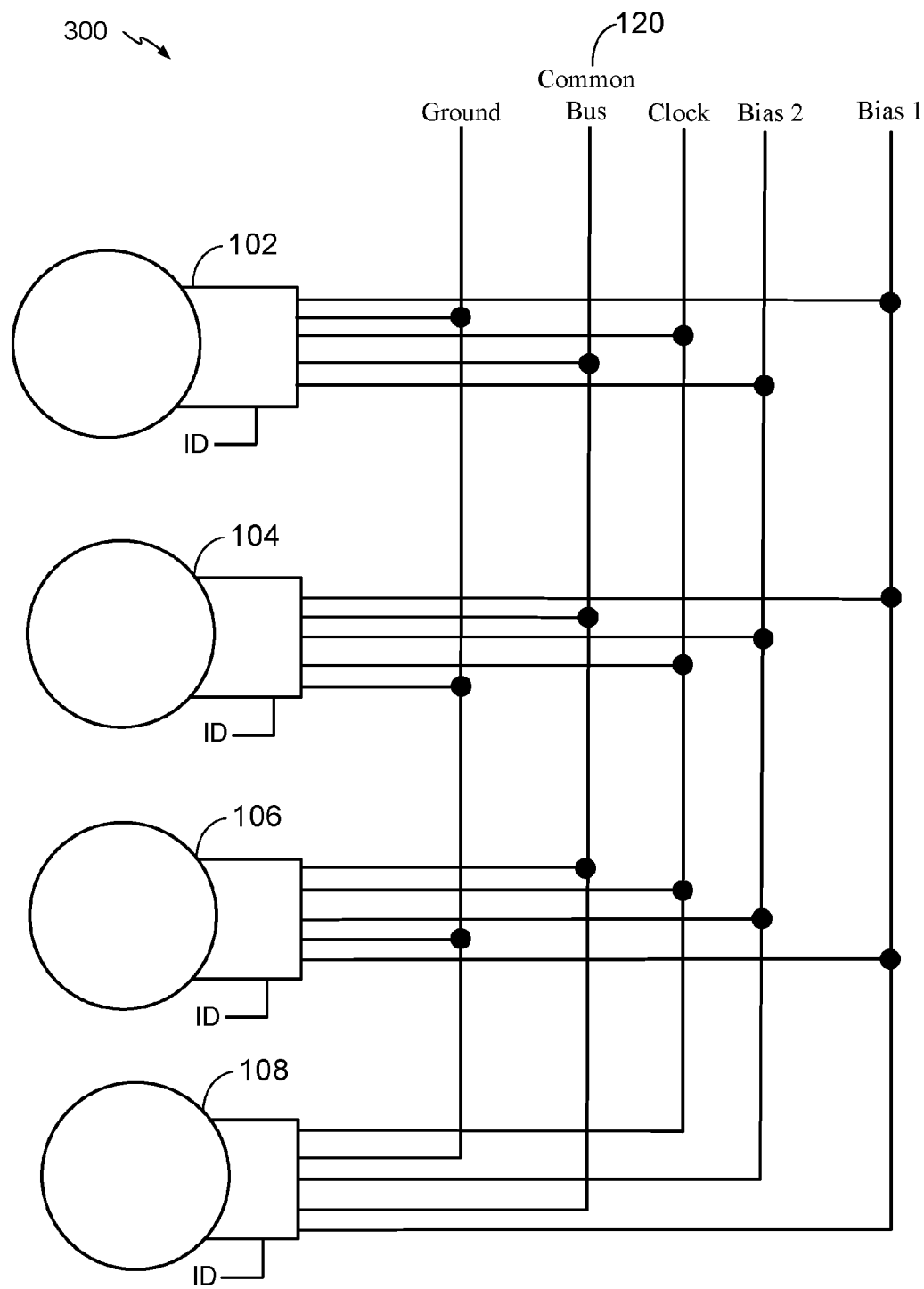
FIG. 3 is a diagram to illustrate another particular aspect of a system that is operable to reduce microphone power-up latency.
Figure 4:
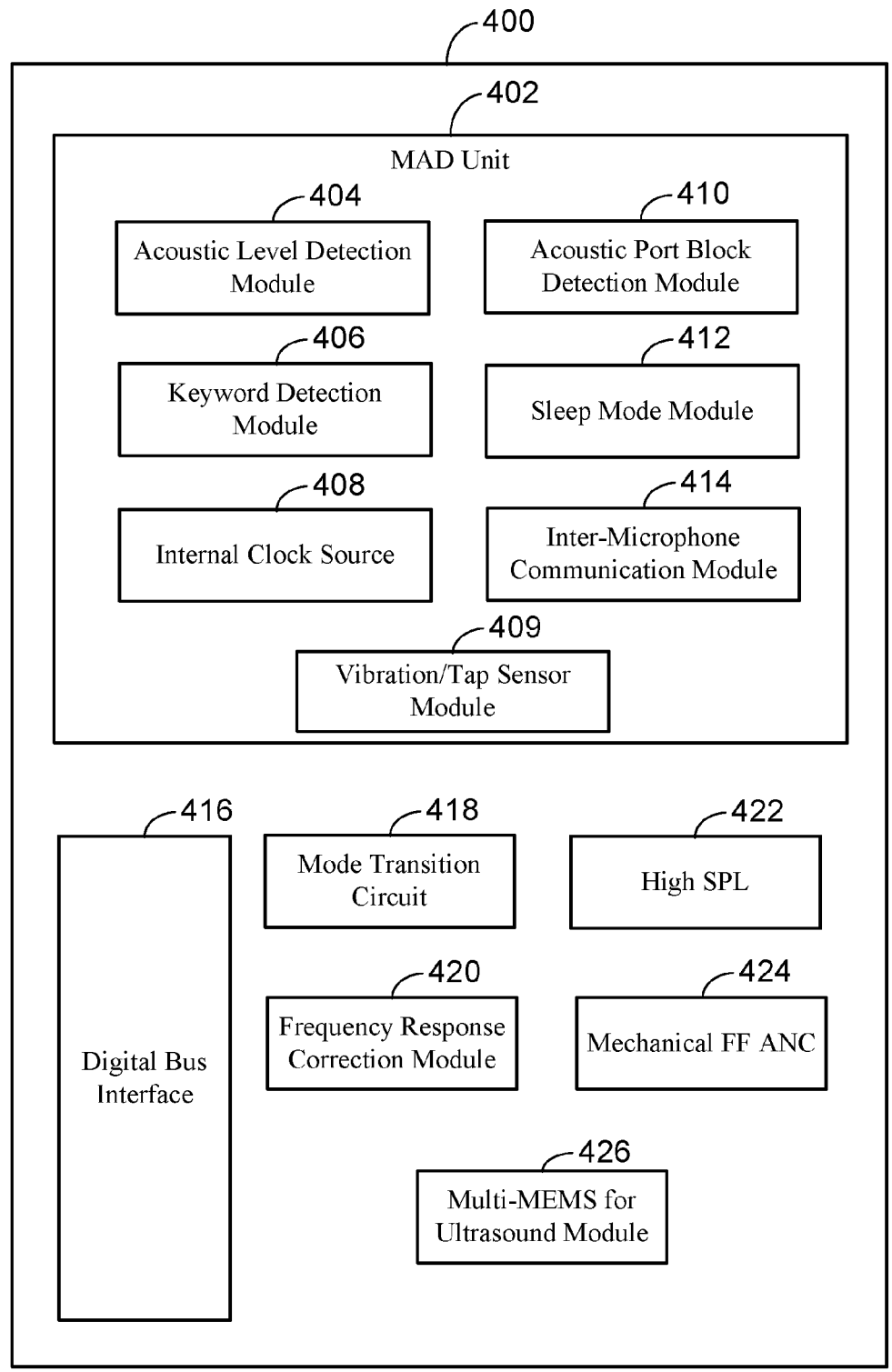
FIG. 4 is a diagram to illustrate another particular aspect of a microphone that is operable to reduce microphone power-up latency.
Figure 5:
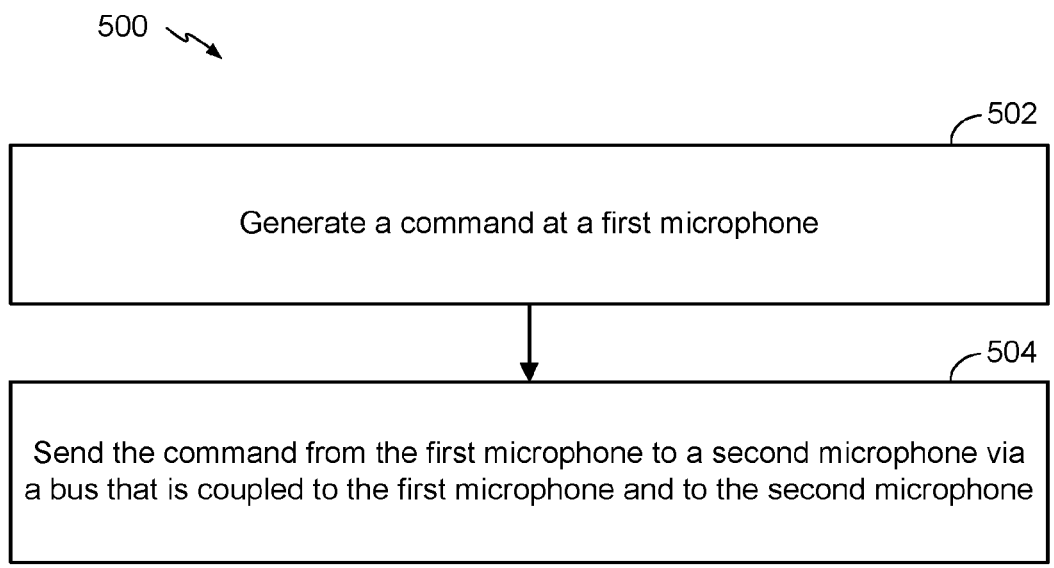
Figure 6:
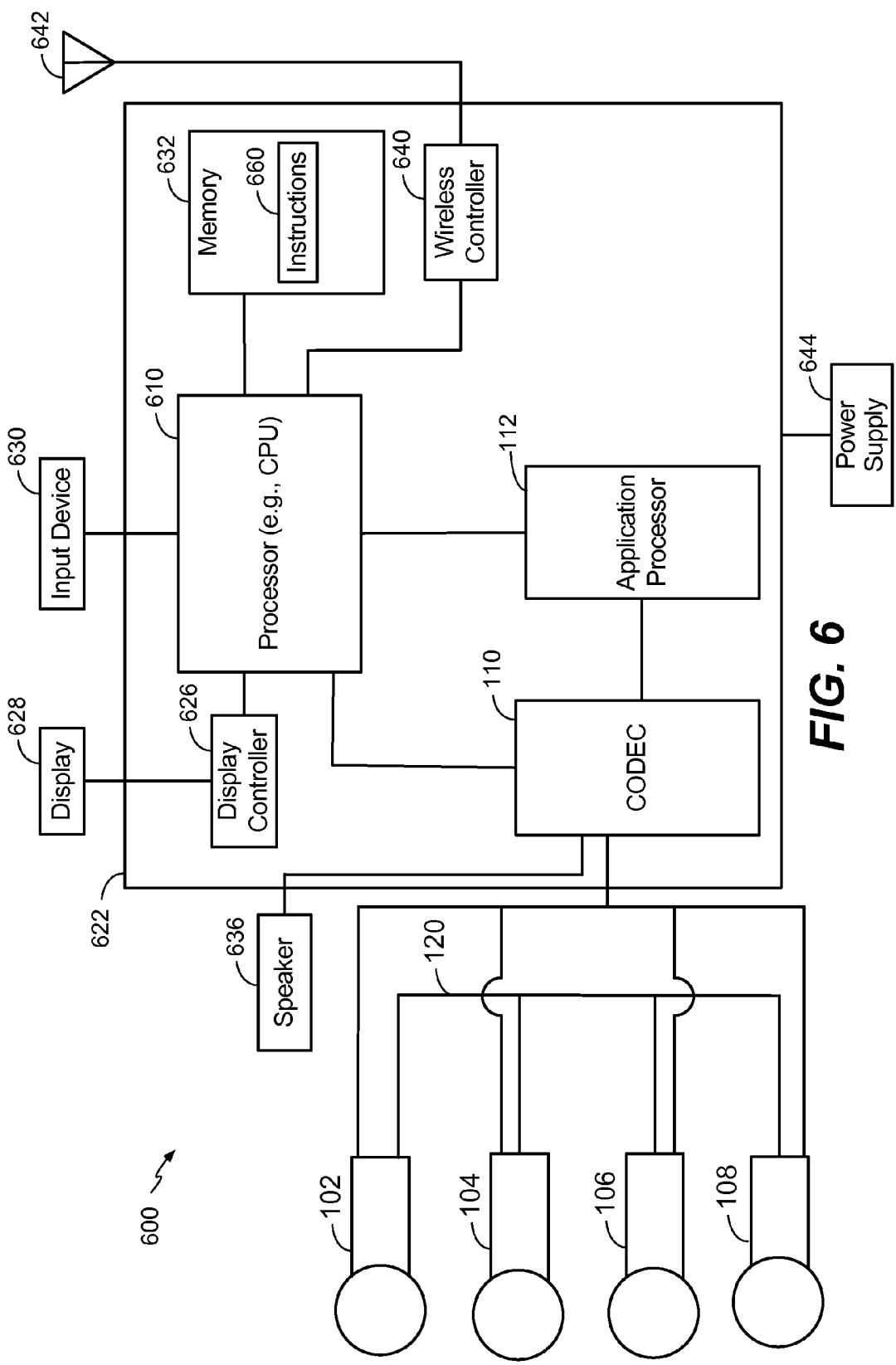

FIG. 5 includes a flowchart to illustrate a particular aspect of a method for reducing microphone power-up latency; and FIG. 6 is a block diagram of a wireless device operable to perform signal processing operations in accordance with the systems and methods of FIGS. 1-5.

V. DETAILED DESCRIPTION

Figure 1:
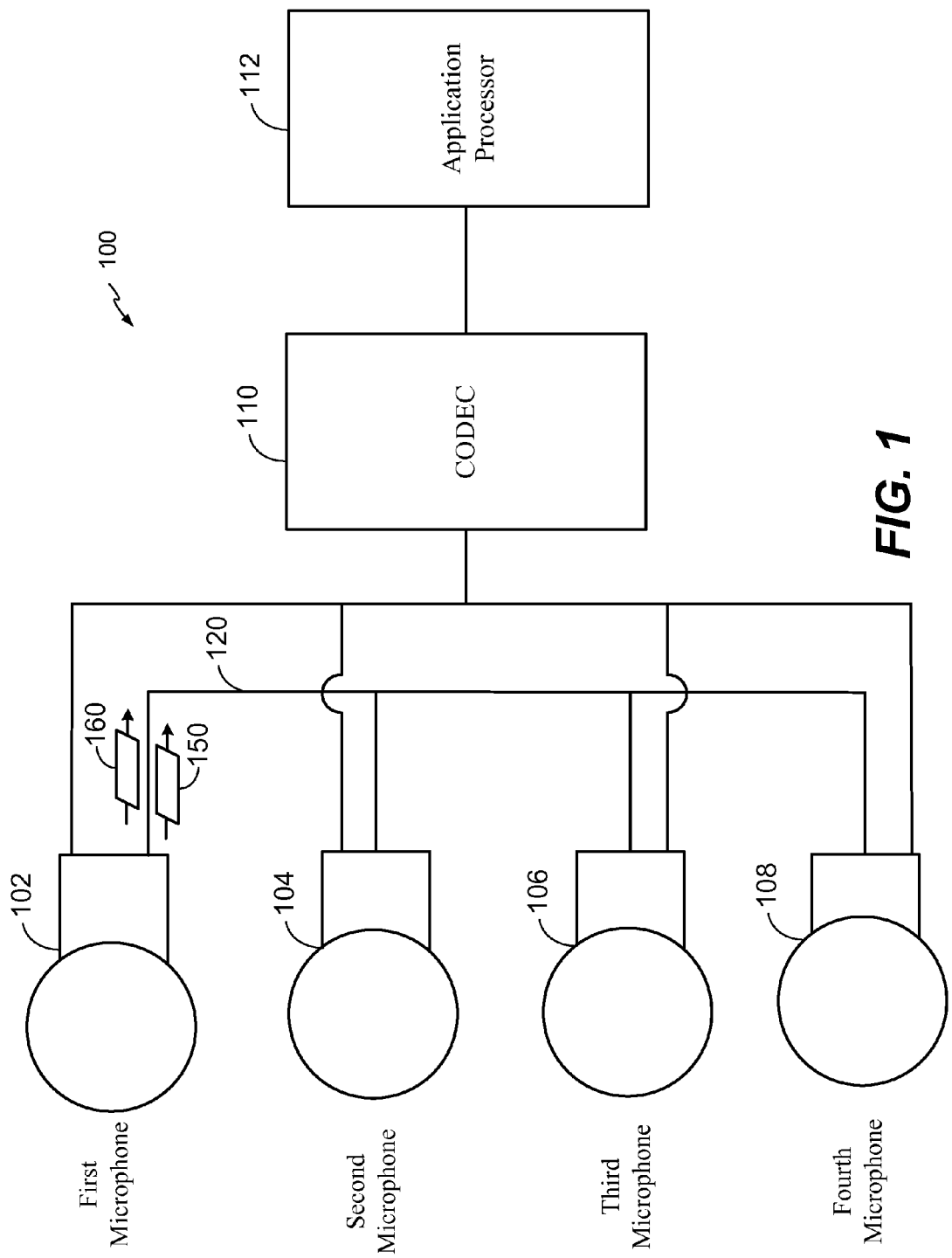
FIG. 1 is a diagram to illustrate a particular aspect of a system that is operable to reduce microphone power-up latency.

Referring to FIG. 1, a particular aspect of a system 100 that is operable to reduce microphone power-up latency is shown. The system 100 includes a first microphone 102, a second microphone 104, a third microphone 106, a fourth microphone 108, a CODEC 110 (e.g., an "audio front-end" device), and an application processor 112. In a particular embodiment, the components of the system 100 may be implemented in a wireless device (e.g., a mobile phone).

Alternatively, the system 100 may be integrated into a set top box, a music player, a video player, an entertainment unit, a navigation device, a PDA, a fixed location data unit, or a computer.

The microphones 102-108 may be coupled together via a common bus 120. The common bus 120 may provide a direct connection between the microphones 102-108. For example, the common bus 120 may be a serial bus or a parallel bus. In another particular aspect, the common bus 120 may be a control line that facilitates one-way communication or two-way communication. As described below, signaling between one or more microphones 102-108 may be achieved using the common bus 120. As a non-limiting example, the first microphone 102 may signal (e.g., transmit) a command to one or more of the other microphones 104-108 using the common bus 120.

Additionally, the microphones 102-108 may be coupled to the CODEC 110. The CODEC 110 may be configured to covert analog signals (e.g., analog audio signals from one or more of the microphones 102-108) into digital signals. For example, the CODEC 110 may include an analog-to-digital converter (ADC) that is configured to convert the analog signals to digital signals. The digital signals may be provided to the applications processor 112. The application processor 112 may be configured to perform application-specific processing on the digital signals. As a non-limiting example, the application processor 112 may perform a speech recognition function and/or a speech detection function using the digital signals.

Each microphone 102-108 may be configured to operate in a low power mode (e.g., a "sleep mode") or in a high power mode (e.g., an "active mode"). During the low power mode, a particular microphone 102-108 may be "powered down" to conserve battery power. As a result, the particular microphone 102-108 operating in the low power mode may not be able to detect an acoustic input sound (e.g., speech, noise, and/or environmental noise) at a microphone input; however, the particular microphone operating in the low power mode may be able to receive a command to "wake up" (e.g., enter the high power mode), as described below. During the high power mode, the circuitry within the particular microphone 102-108 may be "powered up" to detect the acoustic input sound at the microphone input.

When the system 100 operates in a low power state, the first microphone 102 may be in the high power mode and the other microphones 104-108 may be in the low power mode. While active, logic circuitry within the first microphone 102 may be configured to perform one or more MAD functions. For example, the logic circuitry may be configured to detect the acoustic input sound at an input of the first microphone 102. In response to detecting the acoustic input sound at the input of the first microphone 102, the logic circuitry may generate a command and send the command to the other microphones 104-108 via the common bus 120. The command may be a "wake up" command 150 that instructs logic circuitry within the other microphones 104-108 to transition the other microphones 104-108 from the low power mode to the high power mode. In a particular aspect, the logic circuitry may generate the wake up command 150 in response to detecting a "keyword" or phrase in the acoustic input sound.

In another particular aspect, the logic circuitry within the first microphone 102 may be configured to detect a signal level at an input of the first microphone 102 and generate the wake up command 150 based on the signal level. For example, the first microphone 102 may include a processor (e.g., a MAD unit) that monitors the noise level at the input of the first microphone 102. In response to the noise level satisfying a threshold, the processor within the first microphone 102 may send the wake up command 150 to the other microphones 104-108 via the common bus 120. As a non-limiting example, in response to the noise level at the input of the first microphone 102 exceeding five decibels, the processor within the first microphone 102 may send the wake up command 150 to the other microphones 104-108 via the common bus 120.

In another particular aspect, the logic circuitry within the first microphone 102 may include a timer that enables the wake up command 150 to be periodically sent to the other microphones 104-108 via the common bus 120. For example, the timer may send a signal to the logic circuitry after intervals of inactivity (e.g., intervals when an acoustic input sound is not detected). As a non-limiting example, the timer may send the signal to the logic circuitry within the first microphone 102 every 20 milliseconds (ms). Upon receiving the signal, the logic circuitry may send the wake up command 150 to the other microphones 104-108 via the common bus 120.

Upon receiving the wake up command 150 from the first microphone 102, logic circuitry within the other microphones 104-108 may transition the other microphones 104-108 from the low power state to the high power state. As a non-limiting example, if the first microphone 102 sends the wake up command 150 to the second microphone 104 in response to a criteria (e.g., acoustic input sound detection, signal level strength, inactivity interval, etc.) being satisfied, logic circuitry within the second microphone 104 may activate the second microphone 104 in response to receiving the wake up command 150. When the second microphone 104 is activated, the second microphone 104 may detect acoustic input sounds and provide the detected acoustic input sounds to the CODEC 110 and to the application processor 112 for application-specific processing.

In certain scenarios, a port (e.g., the input) of the first microphone 102 may be blocked in such a manner that acoustic input sound detection (e.g., speech, noise, and/or environmental noise) is substantially prohibited at the first microphone 102. For example, the port of the first microphones 102 may be covered by an object (e.g., clothing, a hand, etc.) such that the logic circuitry within the first microphone 102 is substantially prohibited from detecting acoustic input sounds at the input of the first microphone 102. Thus, based on the port blockage, certain scenarios may occur whereby the first microphone 102 (e.g., the microphone in the high power mode) does not send a signal to the other microphones 104-108 (e.g., the microphones in the low power mode) to wake up because the first microphone 102 is unable to detect acoustic input sounds at the port.

To circumvent problems due to the above described scenario, the logic circuitry within the first microphone 102 may send a command (e.g., a "handover" command 160) to another microphone 104-108 that instructs the other microphone 104-108 to enter the high power mode and monitor for acoustic input sounds (e.g., the handover command 160 "hands over" the MAD function to the other microphone 104-108). As a non-limiting example, the first microphone 102 may include a low noise level detector that is configured to monitor a noise level at the input of the first microphone 102. If the low noise level detector determines that the noise level at the input of the first microphone 102 fails to satisfy a threshold level (e.g., fails to exceed the threshold level), the low noise level detector may determine that the port (e.g., the input) of the first microphone 102 is blocked by an object. Based on the determination, the low noise level detector may generate and send the handover command 160 to the second microphone 104 via the common bus 120. In response to sending the handover command 160 to the second microphone 104, the first microphone 102 may enter the low power mode.

In response to receiving the handover command 160 from the first microphone 102, the second microphone 104 may enter the high power mode and may perform the MAD functions previously performed by the first microphone 102. For example, in response to receiving the handover command 160 from the first microphone 102, the logic circuitry within the second microphone 104 may send a wake up command to the other microphones 102, 106, 108 in response to a criteria (e.g., acoustic input sound detection, signal level strength, inactivity interval, etc.) being satisfied.

The system 100 of FIG. 1 may reduce microphone power-up latency (e.g., reduce the amount of time between detecting acoustic input sounds and "waking up" the other microphones 104-108) compared to a conventional architecture in which a software driver in the application processor 112 sends a command to the CODEC 110 to activate the other microphones 104-108. For example, the logic circuitry within the first microphone 102 (as opposed to the application processor 112) may determine to wake up the other microphones 104-108 during power up. Accordingly, signaling between the first microphone 102 and the application processor 112 and signaling between the application processor 112 and the other microphones 104-108 is reduced. Reducing signaling between the application processor 112 and the microphones 102-108 may reduce battery consumption.

Additionally, the system 100 may circumvent activity detection problems due to port blockage. For example, by generating and sending the handover command 160 to the second microphone 104 in response to a determination that the input of the first microphone 102 is blocked by an object, the first microphone 102 may hand over MAD functions to the second microphone 104 when the first microphone 102 is unable to perform the MAD functions due to port blockage.

Figure 2:
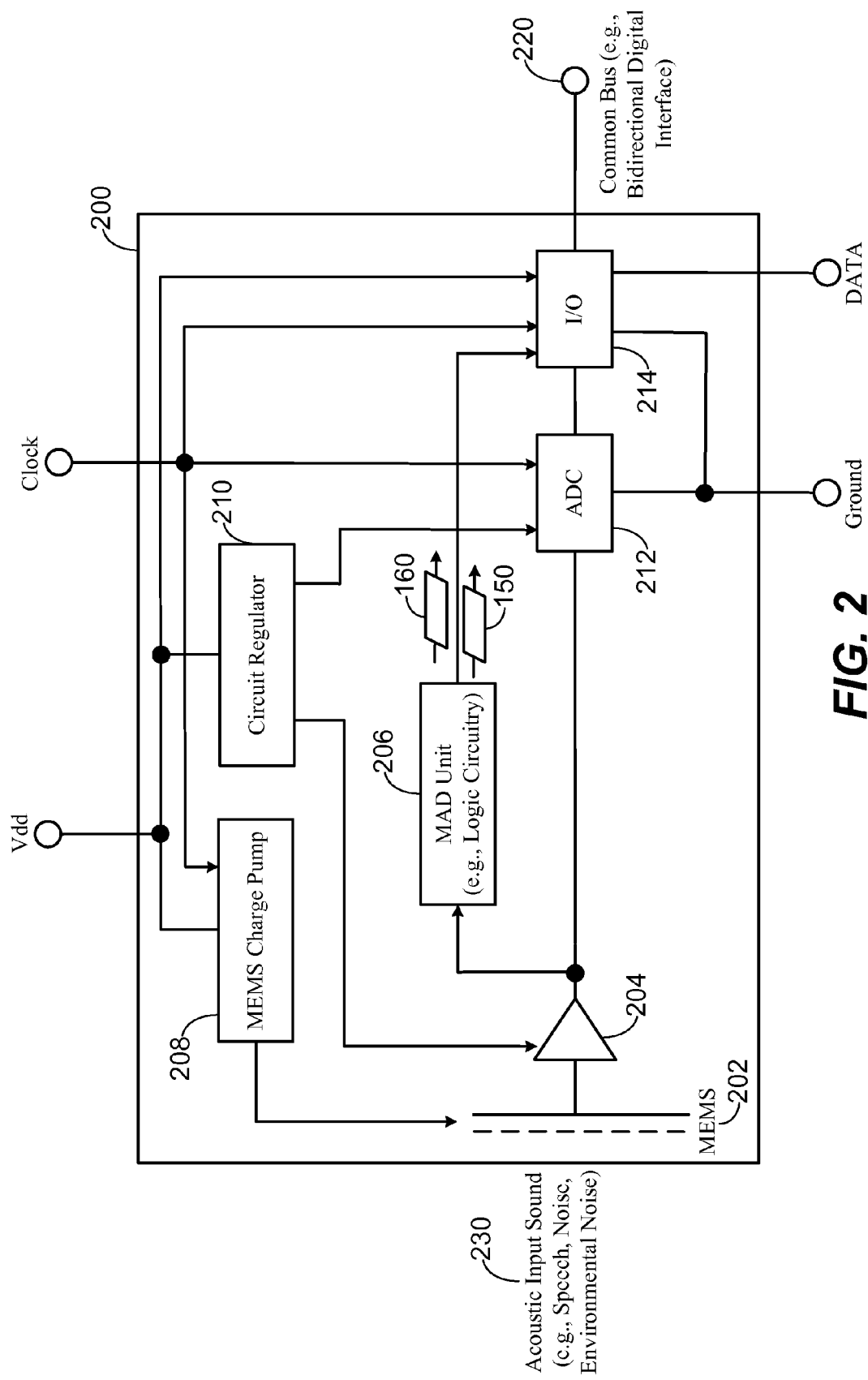
FIG. 2 is a diagram to illustrate a particular aspect of a microphone that is operable to reduce microphone power-up latency.

Referring to FIG. 2, a particular illustrative implementation of a microphone 200 that is operable to reduce microphone power-up latency is shown. The microphone 200 may include a micro-electrical-mechanical system (MEMS) 202, a controllable gain filter 204, a MAD unit 206, a MEMS charge pump 208, a circuit regulator 210, an ADC 212, and an input/output (I/O) interface 214. In a particular aspect, the microphone 200 may correspond to one or more of the microphones 102-108 of FIG. 1.

A supply voltage (Vdd) may be coupled to the MEMS charge pump 208, to the circuit regulator 210, and to the I/O interface 214. A clock line (Clock) may be coupled to the MEMS charge pump 208, to the ADC 212, and to the I/O interface 214. The clock line (Clock) may provide a clock signal to components of the microphone 200 to synchronize intra-microphone operations. Additionally, the clock line (Clock) may provide the clock signal to other microphones to synchronize inter-microphone operations. A ground voltage (Ground) may be coupled to the ADC 212 and to the I/O interface 214, and a data bus (DATA) may be coupled to the I/O interface 214.

The MEMS 202 may be an acoustic-to-electric transducer (or sensor) that is configured to convert sound in air into an electrical signal. For example, the MEMS 202 may be configured to convert an acoustic input sound 230 (e.g., speech, noise, environmental noise, etc.) into an electrical signal. The MEMS 202 may be responsive to a signal provided by the MEMS charge pump 208. The MEMS 202 may use electromagnetic induction, capacitance change, or piezoelectricity to produce the electrical signal in response to air pressure variations. The electrical signal may be provided to the controllable gain filter 204.

The controllable gain filter 204 may filter components of the electrical signal and provide the filtered components to the MAD unit 206 (e.g., logic circuitry) and to the ADC 212. The controllable gain filter 204 may be responsive to a signal provided by the circuit regulator 210. The ADC 212 may convert the filtered components of the electrical signal into a digital signal and may provide the digital signal to the I/O interface 214. The I/O interface 214 may provide the digital signal to a CODEC (e.g., the CODEC 110 of FIG. 1) via the data bus.

The MAD unit 206 may be configured to perform MAD functions based on the filtered components of the electrical signal provided by the controllable gain filter 204. For example, the MAD unit 206 may be configured to generate a command (e.g., the wakeup command 150 of FIG. 1 and/or the handover command 160 of FIG. 1) and to send the command from the microphone 200 to another microphone (not shown) via a common bus 220 (e.g., a bidirectional digital interface) that is coupled to the microphone 200 and to the other microphone. To illustrate, if the microphone 200 corresponds to the first microphone 102 of FIG. 1, the MAD unit 206 may generate the wakeup command 150 and/or the handover command 160 and send the generated command 150, 160 to the second microphone 104 via the common bus 220 (e.g., the common bus 120 of FIG. 1).

In a particular aspect, the MAD unit 206 may be configured to detect the acoustic input sound 230 at a port of the microphone 200. The MAD unit 206 may send the wakeup command (e.g., the wakeup command 150 of FIG. 1) to the other microphone (via the I/O interface 214 and the common bus 220) in response to detecting the acoustic input sound 230. For example, the MAD unit 206 may instruct one or more other microphones to transition from the low power mode to the high power mode (by sending the wakeup command) in response to detecting the acoustic input sound 230.

In another particular aspect, the MAD unit 206 may be configured to detect the acoustic input sound 230 and to compare a sound level of the acoustic input sound 230 to a threshold. The MAD unit 206 may send the wakeup command 150 to the other microphone (via the I/O interface 214 and the common bus 220) in response to a determination that the sound level of the acoustic input sound 230 satisfies (e.g., exceeds) the threshold.

In another particular aspect, the MAD unit 206 may be configured to detect a keyword in the acoustic input sound 230. For example, the MAD unit 206 may include a keyword detection module (as described in greater detail with respect to FIG. 4) to detect the keyword in the acoustic input sound 230. The MAD unit 206 may send the wakeup command 150 to the other microphone (via the I/O interface 214 and the common bus 220) in response to detecting the keyword. In another particular aspect, the MAD unit 206 may determine whether a particular period of time has elapsed since commanding the other microphone to transition from the low power mode to the high power mode (e.g., whether a particular period of time has elapsed since generating and sending a wakeup command 150). As a non-limiting example, the MAD unit 206 may be configured to send the wakeup command 150 at least once every 20 milliseconds (ms). Thus, the MAD unit 206 may determine whether 20 ms has elapsed since generating and sending a wakeup command 150. The MAD unit 206 may send the wakeup command 150 to the other microphone (via the I/O interface 214 and the common bus 220) in response to a determination that the particular period of time (e.g., 20 ms) has elapsed.

The MAD unit 206 may also be configured to determine whether the port of the microphone 200 is blocked. For example, the MAD unit 206 may detect the acoustic input sound 230 at the port of the microphone and may compare the sound level of the acoustic input sound to a threshold. If the sound level of the acoustic input sound 230 is below the threshold, the MAD unit 206 may determine that the port of the microphone 200 is blocked. In response to determining that the port of the microphone 200 is blocked, the MAD unit 206 may generate the handover command 160 and send the handover command 160 to the other microphone (via the I/O interface 214 and the common bus 220). The MAD unit 206 may select the other microphone (e.g., a destination microphone) based on a microphone hierarchy order. For example, each microphone may have a unique identification (ID) number. The MAD unit 206 may populate a destination field of the handover command 160 with the ID number of the destination microphone, and the handover command 160 may be sent to the destination microphone (e.g., the microphone that is next in the hierarchy order).

The handover command 160 may instruct the other microphone to transition from the low power mode to the high power mode and to perform MAD functions. For example, in response to receiving the handover command 160, a MAD unit within the other microphone may perform the MAD functions performed at the MAD unit 206. To illustrate, the MAD unit in the other microphone may detect an acoustic input sound at a port of the other microphone, compare a sound level of the acoustic input sound to a threshold, detect a keyword, etc. The microphone 200 may transition from the high power mode to the low power mode in response to sending the handover command 160 to conserve battery power. In the lower power mode, the I/O interface 214 and the supply voltage (Vdd) are powered up (e.g., "present") and the other components of the microphone 200 may be powered down.

The microphone 200 of FIG. 2 may reduce microphone power-up latency (e.g., reduce the amount of time between detecting acoustic input sounds 230 and "waking up" the other microphones) compared to an architecture in which a software driver in an application processor sends a command to a CODEC to activate the other microphones. For example, the MAD unit 206 (as opposed to an application processor) may determine to wake up the other microphones during power up. The microphone 200 may also circumvent activity detection problems due to port blockage. For example, by generating and sending the handover command 160 to another microphone in response to a determination that the port of the microphone 200 is blocked, the MAD unit 206 may hand over MAD functions to another microphone when the MAD unit 206 is unable to perform the MAD functions due to port blockage.

Referring to FIG. 3, another particular aspect of a system 300 that is operable to reduce microphone power-up latency is shown. The system 300 includes the first microphone 102, the second microphone 104, the third microphone 106, and the fourth microphone 108. Each microphone 102-108 may operate in a substantially similar manner as described with respect to FIG. 1. Additionally, each microphone 102-108 may have a similar architecture as the microphone 200 of FIG. 2 and may operate in a substantially similar manner as the microphone 200.

Each microphone 102-108 may be coupled to a first bias line (Bias 1), to a second bias line (Bias 2), to a clock line (Clock), to the common bus 120, and to a ground line (Ground). The first bias line (Bias 1) may be a high supply voltage and the second bias line (Bias 2) may be a low supply voltage. For example, if the first microphone 102 is in the high power mode, the first bias line (Bias 1) may supply power to the first microphone 102. If the other microphones 104-108 are in the low power mode, the second bias line (Bias 2) may supply power to the other microphones 104-108. The clock line (Clock) and the ground line (Ground) may operate in a similar manner as described with respect to FIG. 2. For example, the first microphone 102 may provide a clock signal to the other microphones 104-108 via the clock line (Clock) to synchronize inter-microphone operations.

The common bus 120 may communicate commands (e.g., the wakeup command 150 and/or the handover command 160) between microphones 102-108. Each microphone 102-108 may have a unique identification (ID) number (e.g., a serial number). The ID numbers of the microphones 102-108 may be populated in a destination field of the commands 150, 160. For example, the ID numbers of the microphones 104-108 may be populated in the destination field of the wake up command 150 sent from the first microphone 102. As another example, the ID number of the second microphone 104 may be populated in the destination field of the handover command 160 sent from the first microphone 102 to the second microphone 104.

The system 300 of FIG. 3 may reduce microphone power-up latency (e.g., reduce the amount of time between detecting acoustic input sounds and "waking up" the other microphones 104-108) compared to an architecture in which a software driver in an application processor sends a command to a CODEC to activate the other microphones 104-108. For example, the first microphone 102 may send commands directly to the other microphones 104-108 via the common bus 120.

Referring to FIG. 4, another particular illustrative aspect of a microphone 400 that is operable to reduce microphone power-up latency is shown. In a particular aspect, the microphone 400 may correspond to one or more of the microphones 102-108 of FIGS. 1 and 3 and/or the microphone 200 of FIG. 2. The microphone 400 may include a MAD unit 402.

The MAD unit 402 may include an acoustic level detection module 404, a keyword detection module 406, an internal clock source 408, a vibration/tap sensor module 409, an acoustic port block detection module 410, a sleep mode module 412, and an inter-microphone communication module 414. Each module 404-414 may be implemented by instructions that are executable by a processor.

The acoustic level detection module 404 may be configured to detect acoustic input sound at a port of the microphone 400. The acoustic level detection module 404 may send a wakeup command (e.g., the wakeup command 150 of FIG. 1) to another microphone (via the inter-microphone communication module 414) in response to detecting the acoustic input sound. For example, the acoustic level detection module 404 may instruct the other microphone to transition from the low power mode to the high power mode (by sending the wakeup command) in response to detecting the acoustic input sound.

The keyword detection module 406 may be configured to detect a keyword in the acoustic input sound. The keyword detection module 406 may send a wakeup command (e.g., the wakeup command 150 of FIG. 1) to another microphone (via the inter-microphone communication module 414) in response to detecting the keyword. For example, the keyword detection module 406 may instruct the other microphone to transition from the low power mode to the high power mode (by sending the wakeup command) in response to detecting the keyword.

The internal clock source 408 may be configured to determine whether a particular period of time has elapsed since commanding another microphone to transition from the low power mode to the high power mode (e.g., whether a particular period of time has elapsed since generating and sending a wakeup command). The internal clock source 408 may trigger the inter-microphone communication module 414 to send a wakeup command to the other microphone in response to a determination that the particular period of time has elapsed. In another aspect, the internal clock source 408 may drive the microphone 400 and other microphones connected to the microphone via a common bus (e.g., the common bus 120 of FIG. 1). For example, the microphone 400 may be a "server device" and the other microphones coupled to the microphone 400 may be "client devices." The internal clock source 408 may provide a clock signal to the other microphones to conserve battery power at the other microphones. For example, by providing the clock signal to the other microphones, the internal clock source 408 may eliminate the other microphones from having to generate clock signals (which may reduce battery power consumption).

The vibration/tap sensor module 409 may be configured to detect vibrations, taps, or other percussion-type activity at the input of the microphone 400. The vibration/tap sensor module 409 may send a wakeup command (e.g., the wakeup command 150 of FIG. 1) to another microphone (via the inter-microphone communication module 414) in response to detecting the vibrations/taps. For example, the vibration/tap sensor module 409 may instruct the other microphone to transition from the low power mode to the high power mode in response to detecting vibrations/taps. Thus, the vibration/tap sensor module 409 may be used to activate other microphones in response to percussion-type activity at the input of the microphone 400.

The acoustic port block module 410 may be configured to determine whether the port of the microphone 400 is blocked. For example, the acoustic port block module 410 may detect the acoustic input sound at the port the microphone and compare the sound level of the acoustic input sound to a threshold. If the sound level of the acoustic input sound is below the threshold, the acoustic port block module 410 may determine that the port of the microphone 400 is blocked. In response to determining that the port of the microphone 400 is blocked, the acoustic port block module 410 may generate a handover command (e.g., the handover command 160 of FIG. 1) and send the handover command 160 to another microphone (via the inter-microphone communication module 414). In a particular embodiment, the acoustic level detection module 404, the keyword detection module 406, the vibration/tap sensor module 409, and the acoustic port block detection module 410 may be included in a single module or unit.

The sleep mode module 412 may be configured to transition the microphone 400 from the high power mode to the low power mode. To conserve battery power, the sleep mode module 412 may be activated upon sending the handover command to the other microphone. For example, the sleep mode module 412 may deactivate (e.g., power down) the acoustic level detection module 404, the keyword detection module 406, the vibration/tap sensor module 409, and the acoustic port block detection module 410.

The microphone 400 may also include a digital bus interface 416 configured to communicate data to one or more external components within a system. For example, the digital bus interface 416 may communicate data to a CODEC (e.g., the CODEC 110 of FIG. 1). The microphone 400 may also include a mode transition circuit 418 that is operable to transition the microphone between a high power mode and a low power mode. In a particular aspect, the mode transition circuit 418 may work in conjunction with the sleep mode module 412. For example, the mode transition circuit 418 may also deactivate the acoustic level detection module 404, the keyword detection module 406, the vibration/tap sensor module 409, and the acoustic port block detection module 410.

The microphone 400 may also include a frequency response correction module 420 that is operable to correct for a frequency response that is generated when the microphone 400 is plugged into a port of a handset, which may cause a frequency response. The microphone 400 may also include a high sound pressure level (SPL) feature 422 to accommodate sounds (e.g., the acoustic input sound 230 of FIG. 2) having a relatively high pressure.

The microphone 400 may also include mechanical feed-forward (FF) active noise cancellation (ANC) 424 that is operable to "cancel" environmental noise (e.g., echoes, vibrations, etc.) detected at the microphone 400 to enhance the quality of the acoustic input. The microphone 400 may also include a multi-MEMS for ultrasound module 426 that is operable to tune a first MEMS within the microphone 400 for audio frequencies and to tune a second MEMS within the microphone 400 for ultrasound frequencies. The first MEMS and the second MEMS may be coupled to the MAD unit 402 to enable the MAD unit 402 to perform MAD functions based on audio frequencies and ultrasound frequencies.

The microphone 400 of FIG. 4 may reduce microphone power-up latency (e.g., reduce the amount of time between detecting acoustic input sounds and "waking up" the other microphones) compared to an architecture in which a software driver in an application processor sends a command to a CODEC to activate the other microphones. For example, the MAD unit 402 (as opposed to an external CODEC) may determine to wake up the other microphones during power up. Based on the determination, the microphone 400 may directly communicate a wakeup command to the other microphones via a common bus. Communicating the wakeup command via a common bus coupled to the microphone 400 and to the other microphones may reduce the power-up latency otherwise associated with an architecture in which an applications processor sends a wakeup command to a CODEC to activate the other microphones.

Referring to FIG. 5, a flowchart that illustrates a particular aspect of a method 500 for reducing microphone power-up latency is shown. The method 500 may be performed by the one or more of the microphones 102-108 of FIGS. 1 and 3, the microphone 200 of FIG. 2, the microphone 400 of FIG. 4, or any combination thereof.

The method 500 includes generating a command at a first microphone, at 502. For example, referring to FIG. 1, the first microphone 102 may generate a command (e.g., the wakeup command 150 and/or the handover command 160) based on certain criteria, as described herein.

The command may be sent from the first microphone to a second microphone via a bus that is coupled to the first microphone and to the second microphone, at 504. For example, referring to FIG. 1, the first microphone 102 may send the wakeup command 150 and/or the handover command 160 to the second microphone 104 via the common bus 120 coupled to the microphones 102, 104.

In a particular aspect, the method 500 may include detecting acoustic input sound at a port of the first microphone. For example, referring to FIG. 1, the first microphone 102 may detect acoustic input sound at the port of the first microphone 102. The first microphone 102 may send the wakeup command 150 to the second microphone 104 via the common bus 120 in response to detecting the acoustic input sound. For example, the first microphone 102 may instruct the second microphone 104 to transition from the low power mode to the high power mode (by sending the wakeup command 150) in response to detecting the acoustic input sound.

In a particular aspect, the method 500 may include comparing a sound level of the acoustic input sound to a threshold. For example, referring to FIG. 1, the first microphone 102 may detect the acoustic input sound and compare a sound level of the acoustic input sound to a threshold. The first microphone 102 may send the wakeup command 150 to the second microphone 104 via the common bus 120 in response to a determination that the sound level of the acoustic input sound satisfies (e.g., exceeds) the threshold. For example, the first microphone 102 may instruct the second microphone 104 to transition from the low power mode to the high power mode (by sending the wakeup command 150) in response to the sound level satisfying the threshold.

In a particular aspect, the method 500 may include detecting a keyword at the first microphone. For example, referring to FIG. 1, the first microphone 102 may detect a keyword in the acoustic input sound. The first microphone 102 may send the wakeup command 150 to the second microphone 104 via the common bus 120 in response to detecting the keyword. For example, the first microphone 102 may instruct the second microphone 104 to transition from the low power mode to the high power mode (by sending the wakeup command 150) in response to detecting the keyword.

In a particular aspect, the method 500 may include determining whether a particular period of time has elapsed since commanding the second microphone to transition from the low power mode to the high power mode. For example, referring to FIG. 1, the first microphone 102 may determine whether a particular period of time has elapsed since generating and sending a wakeup command 150 to the second microphone 104. The first microphone 102 may send the wakeup command 150 to the second microphone 104 via the common bus 120 in response to a determination that the particular period of time has elapsed. For example, the first microphone 102 may instruct the second microphone 104 to transition from the low power mode to the high power mode (by sending the wakeup command 150) in response to determining that the particular period of time has elapsed.

In a particular aspect, the method 500 may include determining whether a port of the first microphone is blocked. For example, referring to FIG. 1, a determination as to whether the port of the first microphone 102 is blocked may be made. To illustrate, the MAD unit 206 of FIG. 2 may detect the acoustic input sound 230 at the port of the microphone 200 and may compare the sound level of the acoustic input sound 230 to a threshold. If the sound level of the acoustic input sound 230 is below the threshold, the MAD unit 206 may determine that the port of the microphone 200 is blocked. In response to determining that the port of the microphone 200 is blocked, the MAD unit 206 may generate the handover command 160 and send the handover command 160 to a destination microphone (e.g., the second microphone 104 of FIG. 1). A destination field of the handover command 160 may be populated with the ID number of the destination microphone.

The handover command 160 may instruct the second microphone 104 to transition from the low power mode to the high power mode and to perform MAD functions. For example, in response to receiving the handover command 160, a MAD unit within the second microphone 104 may perform the MAD functions.

The method 500 of FIG. 5 may reduce microphone power-up latency (e.g., reduce the amount of time between detecting acoustic input sounds and "waking up" the other microphones 104-108) compared to an architecture in which a software driver in the application processor 112 sends a command to the CODEC 110 to activate the other microphones 104-108. For example, the logic circuitry within the first microphone 102 (as opposed to the application processor 112) may determine to wake up the other microphones 104-108 during power up. Accordingly, signaling between the first microphone 102 and the application processor 112 and signaling between the application processor 112 and the other microphones 104-108 is reduced. Reducing signaling between the application processor 112 and the microphones 102-108 may reduce battery consumption.

Additionally, the method 500 may circumvent address detection problems due to port blockage. For example, by generating and sending the handover command 160 to the second microphone 104 in response to a determination that the input of the first microphone 102 is blocked by an object, the first microphone 102 may hand over MAD functions to the second microphone 104 when the first microphone 102 is unable to perform the MAD functions due to port blockage.

In particular aspects, the method 500 of FIG. 5 may be implemented via hardware (e.g., a FPGA device, an ASIC, etc.) of a processing unit, such as a central processing unit (CPU), a DSP, or a controller, via a firmware device, or any combination thereof. For example, the method 500 may be performed by one of the microphones 102-108 of FIGS. 1 and 3, the microphone 200 of FIG. 2 (e.g., the MAD unit 206 of FIG. 2), the microphone 400 of FIG. 4 (e.g., the MAD unit 402 of FIG. 4), or any combination thereof.

Referring to FIG. 6, a block diagram of a particular illustrative aspect of a wireless communication device is depicted and generally designated 600. The device 600 includes a processor 610 (e.g., a central processing unit (CPU)) coupled to a memory 632. The memory 632 may include instructions 660 executable by the processor 610, the CODEC 110, or the application processor 112.

The first microphone 102, the second microphone 104, the third microphone 106, and the fourth microphone 108 may be coupled to the CODEC 110. The microphones 102-108 may also be coupled together via the common bus 120. The first microphone 102 may be configured to generate commands (e.g., the wakeup command 150 of FIG. 1 and/or the handover command 160 of FIG. 1) and to send the commands to the other microphones 104-108 via the common bus 120. Each microphone 102-108 may include a non-transitory computer-readable medium that includes processor-executable instructions. For example, the processor-executable instructions may cause processors within the microphones 102-108 to perform the method 500 of FIG. 5. The non-transitory computer-readable medium may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM).

FIG. 6 also shows a display controller 626 that is coupled to the processor 610 and to a display 628. A speaker 636 can be coupled to the CODEC 110. FIG. 6 also indicates that a wireless controller 640 can be coupled to the processor 610 and to an antenna 642. In a particular aspect, the processor 610, the display controller 626, the memory 632, the CODEC 110, and the wireless controller 640 are included in a system-in-package or system-on-chip device 622. In a particular aspect, an input device 630, such as a touchscreen and/or keypad, and a power supply 644 are coupled to the system-on-chip device 622. Moreover, in a particular aspect, as illustrated in FIG. 6, the display 628, the input device 630, the speaker 636, the microphone 638, the antenna 642, and the power supply 644 are external to the system-on-chip device 622. However, each of the display 628, the input device 630, the speaker 636, the microphone 638, the antenna 642, and the power supply 644 can be coupled to a component of the system-on-chip device 622, such as an interface or a controller.

In conjunction with the described aspects, a microphone includes means for generating a command. For example, the means for generating the command may include the MAD unit 206 of FIG. 2, the MAD unit 402 of FIG. 4, one or more devices (e.g., a processor executing instructions at a non-transitory computer readable storage medium), or any combination thereof.

The microphone may also include means for sending the command from the microphone to a second microphone via a bus that is coupled to the microphone and to the second microphone. For example, the means for sending the command may include the MAD unit 206 of FIG. 2, the I/O interface 214 of FIG. 2, the MAD unit 402 of FIG. 4, one or more devices (e.g., a processor executing instructions at a non-transitory computer readable storage medium), or any combination thereof.

Those of skill would further appreciate that the various illustrative logical blocks, configurations, modules, circuits, and algorithm steps described in connection with the aspects disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an ASIC. The ASIC may reside in a computing device or a user terminal. In the alternative, the processor and the storage medium may reside as discrete components in a computing device or a user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method comprising:
 generating a command at a first microphone; and
 sending the command from the first microphone to a second microphone via a bus that is coupled to the first microphone and to the second microphone, wherein the command instructs the second microphone to transition from a low power mode to a high power mode.

2. The method of claim 1, wherein the command is a wakeup command.

3. The method of claim 2, further comprising:
 detecting acoustic input sound at a port of the first microphone; and
 sending the wakeup command to the second microphone in response to detecting the acoustic input sound.

4. The method of claim 2, further comprising:
 detecting acoustic input sound at a port of the first microphone;
 comparing a sound level of the acoustic input sound to a threshold; and
 sending the wakeup command to the second microphone in response to a determination that the sound level of the acoustic input sound satisfies the threshold.

5. The method of claim 2, further comprising:
 detecting a keyword at the first microphone; and
 sending the wakeup command to the second microphone in response to detecting the keyword.

6. The method of claim 2, further comprising:
 determining whether a particular period of time has elapsed since commanding the second microphone to transition from the low power mode to the high power mode; and
 sending the wakeup command to the second microphone in response to a determination that the particular period of time has elapsed.

7. The method of claim 1, wherein the command is a handover command that further instructs the second microphone to
 perform microphone activity detection functions.

8. The method of claim 7, wherein the microphone activity detection functions include at least one of detecting acoustic input sound at a port of the second microphone, comparing a sound level of the acoustic input sound to a threshold, detecting a keyword at the second microphone, or determining whether a particular period of time has elapsed since commanding another microphone to transition from the low power mode to the high power mode.

9. The method of claim 7, wherein the microphone activity detection functions further include sending a wakeup command to another microphone via the bus.

10. The method of claim 7, further comprising transitioning into the low power mode after sending the handover command to the second microphone.

11. The method of claim 7, further comprising:
determining whether a port of the first microphone is blocked; and
sending the handover command to the second microphone in response to a determination that the port of the first microphone is blocked.

12. The method of claim 11, wherein determining whether the port of the first microphone is blocked comprises:
detecting acoustic input sound at the port of the first microphone; and
comparing a sound level of the acoustic input sound to a threshold, wherein the port of the first microphone is blocked if the sound level is below the threshold.

13. A microphone comprising:
a processor; and
a memory storing instructions executable by the processor to perform operations comprising:
generating a command; and
sending the command from the microphone to a second microphone via a bus that is coupled to the microphone and to the second microphone, wherein the command instructs the second microphone to transition from a low power mode to a high power mode.

14. The microphone of claim 13, wherein the command is a wakeup command.

15. The microphone of claim 14, wherein the operations further comprise:
detecting an acoustic input sound at a port of the microphone; and
sending the wakeup command to the second microphone in response to detecting the acoustic input sound.

16. The microphone of claim 14, wherein the operations further comprise:
detecting an acoustic input sound at a port of the microphone;
comparing a sound level of the acoustic input sound to a threshold; and
sending the wakeup command to the second microphone in response to a determination that the sound level of the acoustic input sound satisfies the threshold.

17. The microphone of claim 14, wherein the operations further comprise:
detecting a keyword at the microphone; and
sending the wakeup command to the second microphone in response to detecting the keyword.

18. The microphone of claim 14, wherein the operations further comprise:
determining whether a particular period of time has elapsed since commanding the second microphone to transition from the low power mode to the high power mode; and
sending the wakeup command to the second microphone in response to a determination that the particular period of time has elapsed.

19. The microphone of claim 13, wherein the command is a handover command that further instructs the second microphone to
perform microphone activity detection functions.

20. The microphone of claim 19, wherein the operations further comprise:
determining whether a port of the microphone is blocked; and
sending the handover command to the second microphone in response to a determination that the port of the microphone is blocked.

21. A non-transitory computer-readable medium comprising instructions that, when executed by a processor within a microphone, cause the processor to:
generate a command; and
send the command from the microphone to a second microphone via a bus that is coupled to the microphone and to the second microphone, wherein the command instructs the second microphone to transition from a low power mode to a high power mode.

22. The non-transitory computer-readable medium of claim 21, wherein the command is a wakeup command.

23. The non-transitory computer-readable medium of claim 22, wherein the instructions are further executable to cause the processor to send the wakeup command to the second microphone in response to detecting an acoustic input sound at a port of the microphone.

24. The non-transitory computer-readable medium of claim 22, wherein the instructions are further executable to cause the processor to send the wakeup command to the second microphone in response to a determination that a sound level of an acoustic input sound detected at a port of the microphone satisfies a threshold.

25. The non-transitory computer-readable medium of claim 22, wherein the instructions are further executable to cause the processor to send the wakeup command to the second microphone in response to detecting a keyword.

26. The non-transitory computer-readable medium of claim 21, wherein the command is a handover command that further instructs the second microphone to
perform microphone activity detection functions.

27. The non-transitory computer-readable medium of claim 26, wherein the instructions are further executable to cause the processor to:
determine whether a port of the microphone is blocked; and
send the handover command to the second microphone in response to a determination that the port of the microphone is blocked.

28. A microphone comprising:
means for generating a command; and
means for sending the command from the microphone to a second microphone via a bus that is coupled to the microphone and to the second microphone, wherein the command instructs the second microphone to transition from a low power mode to a high power mode.

29. The microphone of claim 28, wherein the command is a wakeup command.

30. The microphone of claim 28, wherein the command is a handover command that further instructs the second microphone to
perform microphone activity detection functions.

* * * * *